United States Patent [19]

Hanada et al.

[11] Patent Number: 5,384,365
[45] Date of Patent: Jan. 24, 1995

[54] RELEASE AGENTS

[75] Inventors: Kazuyuki Hanada; Iwao Misaizu; Masashi Saito; Katsutoshi Torii; Katsumi Kuriyama, all of Nihonbashi, Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 175,181

[22] Filed: Dec. 29, 1993

Related U.S. Application Data

[63] Continuation of Ser. No. 813,020, Dec. 24, 1991, abandoned.

[30] Foreign Application Priority Data

Dec. 28, 1990 [JP] Japan ................... 2-415405

[51] Int. Cl.$^6$ ............................................. C08L 83/08
[52] U.S. Cl. .................... 525/105; 525/477; 525/466; 525/457; 525/440; 525/476; 525/424; 525/431; 525/446
[58] Field of Search ............... 525/105, 477, 466, 457, 525/440, 476, 424, 431, 446

[56] References Cited

U.S. PATENT DOCUMENTS

| | | | |
|---|---|---|---|
| 3,959,242 | 5/1976 | Watts et al. | 526/9 |
| 4,248,750 | 2/1981 | Murakami et al. | 260/29.15 B |
| 4,261,876 | 4/1981 | Reusser | 260/33.65 B |
| 4,534,928 | 8/1985 | Martin | 264/334 |
| 4,546,154 | 10/1985 | Robertson | 525/474 |
| 4,837,274 | 6/1989 | Kawakubo et al. | 525/100 |
| 4,940,846 | 7/1990 | Hintewaldree | 427/385.5 |
| 4,942,212 | 7/1990 | Hanada et al. | 528/28 |
| 5,169,900 | 12/1992 | Gudelis | 525/106 |
| 5,286,815 | 2/1994 | Leir et al. | 525/477 |

*Primary Examiner*—Melvyn I. Marquis
*Assistant Examiner*—Margaret W. Glass
*Attorney, Agent, or Firm*—Oblon, Spivak, McClelland, Maier & Neustadt

[57] ABSTRACT

A release agent comprising a resin containing siloxane segments is described. The resin has been modified with a silane coupling agent containing at least one free isocyanate group and contains one or more hydrolyzable silyl groups in side chains of its molecule.

9 Claims, No Drawings

RELEASE AGENTS

This application is a continuation of application Ser. No. 07/813,020, filed on Dec. 24, 1991, now abandoned.

BACKGROUND OF THE INVENTION

1. Field of the Invention

This invention relates to release agents, and more specifically to release agents capable of imparting excellent release property to the back side of a base material of a tape or the like or to the front side of a release paper, said back side or front side being in a contiguous relation with an .adhesive surface in an adhesive-containing product such as an adhesive tape, an adhesive label or an adhesive seal.

2. Description of the Related Art

Conventional release agents usable for such purposes are known to include acrylic acid compounds containing one or more long-chain alkyl groups bonded thereto, high-molecular compounds such as polyesters and polyamides, and organopolysiloxane compounds. They are used to impart release property to the back side of an adhesive tape or adhesive sheet or to the front side of a release paper so that a release surface can be formed there.

Among these release agents, organopolysiloxane compounds are known to be superior in properties such as release property and residual adhesion.

These organopolysiloxane compounds, however, involve the problems that they are difficult to permit release by suitable force and they require high-temperature baking subsequent to their coating on base materials, thus making it impossible to use them for film-shaped, thermoplastic base materials. They are also accompanied by the problem that they cannot be applied to a wide variety of base materials due to insufficient adhesion to certain types of base materials.

Further, releasable polysiloxane compounds have a small surface tension, leading to the problem that no writing is feasible on their release surfaces. They are also accompanied by the problem that they often exhibit "a repelling phenomenon" upon coating a pressure- or heat-sensitive adhesive on their release surfaces and cannot hence form good coated surfaces.

As a method for overcoming such problems as described above, the present assignees have already proposed that the use of a silicone copolymer as a release agent permits low-temperature baking and provides excellent properties including high adhesion to base materials and good writing quality of release surfaces.

SUMMARY OF THE INVENTION

An object of this invention is to improve the above-described conventional technology further and, hence, to provide a release agent capable of forming a release layer of excellent properties in a simple and easy manner.

The object described above can be achieved by the present invention to be described hereinafter. This invention therefore provides a release agent comprising a resin containing siloxane segments. The resin has been modified with a silane coupling agent containing at least one free isocyanate group and contains one or more hydrolyzable silyl groups in side chains of its molecule.

The incorporation of the specific resin, which has been modified by the particular modifier and contains one or more hydrolyzable silyl groups in side chains of its molecule, in the release agent has made it possible to provide the release agent in one pack for subsequent curing because the resin can be crosslinked by moisture in the air or water. In addition, the adhesion to a base sheet material has been improved owing to the silyl groups.

DETAILED DESCRIPTION OF THE INVENTION

Preferred specific examples of the modifier employed in the invention to modify the siloxane-segment-containing resin include the following compounds:

(1) Silane coupling agents containing at least one free isocyanate group.

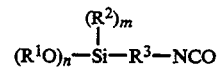

wherein $R^1$ is a lower alkyl group, $R^2$ is a lower alkyl or lower alkoxy group, $R^3$ is a $C_{1-6}$ alkyl group, m stands for an integer of 1-3 and n equals 3 minus m.

(2) Reaction products of silane coupling agents containing a reactive organic functional group with organic polyisocyanates, said reaction products containing at least one free isocyanate group in the molecules thereof.

Examples of the silane coupling agents containing a reactive organic functional group and usable in the above reaction may include the compounds as represented by the following formula:

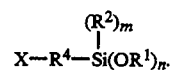

X represents a group reactive with an isocyanage group, for example, an amino group, an epoxy group, a hydroxyl group or a thiol group, with an amino group, an epoxy group or a thiol group being particularly preferred.

$R^1$-$R^3$, m and n have the same meanings as defined above. $R^4$ represents a divalent organic group, with a $C_{2-20}$ aliphatic, aromatic or aliphatic aromatic groups being preferred. These groups may contain therein oxygen, nitrogen and/or sulfur atoms as bond group or groups.

Preferred specific examples of the above silane coupling agent containing a reactive organic functional group include:

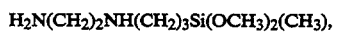

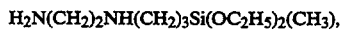

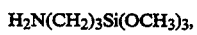

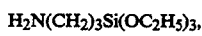

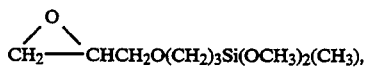

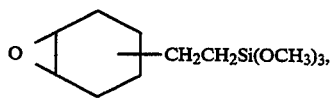

HS(CH₂)₃Si(OCH₃)₃,

HS(CH₂)₃Si(OC₂H₅)₃, and

H₂N(CH₂)₂NHCH₂—Ph—CH₂CH₂Si(CH₃)₃.

It is to be noted that the above silane coupling agents are merely illustrative silane coupling agents preferred in the invention and the invention is not necessarily limited to such exemplified compounds. The above-exemplified and other compounds are commercially sold these days and are hence readily available on the market. They are all usable in the invention.

As the organic polyisocyanate to be reacted with the above silane coupling agents, conventionally-known organic polyisocyanates are all usable. Preferred examples of polyisocyanates include:

Toluene-2,4-diisocyanate,
4-Methoxy-1,3-phenylene diisocyante,
4-Isopropyl-1,3-phenylene diisocyanate,
4-Chloro-1,3-phenylene diisocyanate,
4-Buthoxy-1,3-phenylene diisocyanate,
2,4-Diisocyanate-diphenylether,
Methylene diisocyanate,
4,4-Methylenebis(phenyl isocyanate),
Durylene diisocyanate,
1,5-Naphthalene diisocyanate,
Benzidine diisocyanate,
o-Nitrobenzidine diisocyanate,
4,4-Diisocyanate dibenzidyl,
1,4-Tetramethylene diisocyanate,
1,6-Tetramethylene diisocyanate,
1,10-Decamethylene diisocyanate,
1,4-Cyclohexylene diisocyanate,
Xylylene diisocyanate,
4,4-Methylenebis(cyclohexyl isocyanate), and
1,5-Tetrahydronaphthalene diisocyanate.

Adducts of the above-exemplified organic polyisocyanates with other compounds, for example, those represented by the following formulas can also be mentioned, although the invention is not limited to the use of these examples,

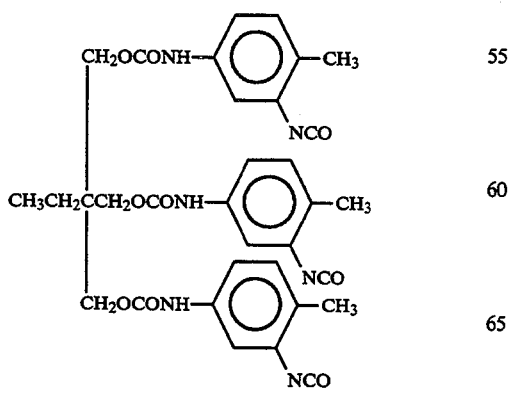

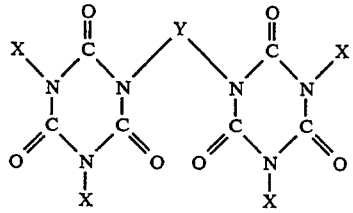

(X = 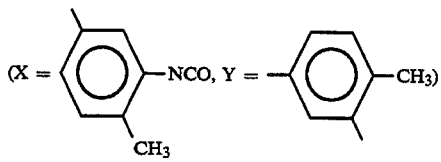

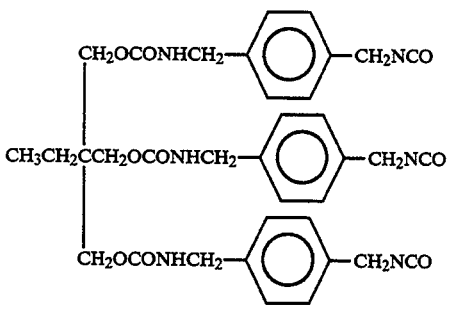

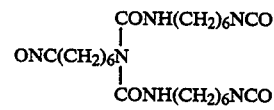

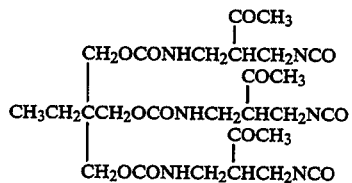

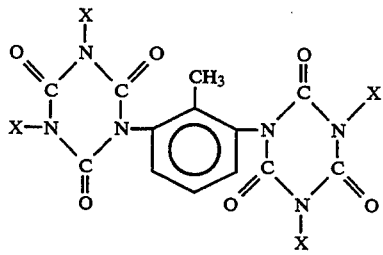

(X = 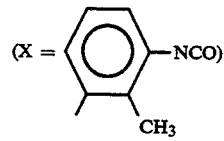)

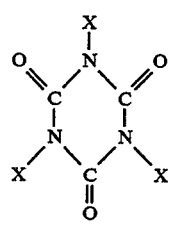

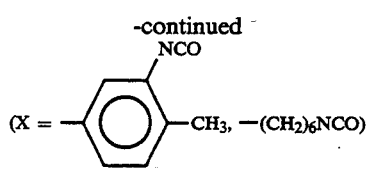

$$(X = {-}\bigcirc{-}CH_3, {-}(CH_2)_6NCO)$$

Needless to say, urethane prepolymers obtained by reacting these organic polyisocyanates with low-molecular-weight polyols or polyamines to form end isocyanates can also be used. Among them, yellowing-free polyisocyanates are particularly preferred.

As resins which can be used in the release agents of the present invention and contain siloxane segments, conventionally-known various film-forming resins containing siloxane segments are all usable. Examples of them include various silicone copolymer resins, i.e. reaction products of silicone modifiers containing at least one free isocyanate group with polyvinyl butyral resins, polyvinyl formal resins, acrylic resins, polyurethane resins, polyester resins, vinyl chloride/vinyl acetate/vinyl alcohol copolymer resins, alkyd resins, epoxy resins, polybutadiene resins, polyurea resins, modified cellulose resins, silicone resins, melamine resins, fluororesins, polyamide resins and phenoxy resins; and siloxane-modified polyester resins obtained by the reaction of siloxane compounds containing one or more active hydrogen groups with ε-caprolactone. These film-forming resins containing siloxane segments are readily available, for example, under the name of "Diallomer" (trade mark) from Dainichiseika Color & Chemicals Mfg. Co., Ltd. for use in the invention. In addition, the above-mentioned resins without polysiloxane segments can also be used in combination with those containing polysiloxane segments in the invention.

Incidentally, these resins can be used either singly or in combination and also as solutions or dispersions in an organic solvent.

When the release agent of the present invention is brought into contact with moisture in the air, water, steam or the like, the hydrolyzable silyl groups therein undergo a crosslinking reaction, leading to the curing of the agent.

In the present invention, it is preferable to add a catalyst to the release agent in order to accelerate the above silanol condensation. Examples of the catalyst include carboxylate salts such as alkyl titanate salts, tin octylate, and dibutyltin dilaurate; amine salts such as dibutylamine-2-ethylhexoate; and other acidic and basic catalysts. It is preferable to add the catalyst in a proportion of about 0.0001–5 wt. %.

The content of silanol groups after modification is preferably within a range of from 0.1 wt. % to 60 wt. % based on the resin so modified, and more preferably within a range of 3–40 wt. % in view of the processability and adhesion.

The present invention will hereinafter be described more specifically by the following examples and comparative examples, in which all designations of "part or parts" and "%" are on a weight basis unless otherwise specifically indicated.

Referential Example 1 (Production of Modifier)

While 150 parts of an adduct of hexamethylene diisocyanate and water ("Duraconate 24A-100", trade name; product of Asahi Chemical Industry Co., Ltd.; NCO %=23.5) were stirred thoroughly at room temperature, 124 parts of 3-aminopropyltriethoxysilane were gradually added dropwise and reacted, whereby 274 parts of a modifier (I) were obtained in the form of a colorless clear viscous liquid.

In an infrared absorption spectrum of the modifier (I) so obtained, absorption by free isocyanate groups was observed at 2,270 cm$^{-1}$ and an absorption band based on —Si—O— groups was also observed at 1,090 cm$^{-1}$. As a result of a quantitative analysis of free isocyanate groups in the modifier, their content was found to be 3.92% while the theoretical value is 4.20%.

Referential Example 2 (Production of Modifier)

While 150 parts of an adduct of trimethylol propane and hexamethylene diisocyanate at a molar ratio of 1:3 ("Colonate HL", trade name; product of Nippon Polyurethane Co., Ltd.; NCO %=12.5; solid content: 75%) were stirred thoroughly at room temperature, 76 parts of N-phenyl-γ-aminopropyltriethoxysilane were gradually added dropwise and reacted, whereby 185 parts of a modifier (II) were obtained in the form of a colorless clear viscous liquid.

In an infrared absorption spectrum of the modifier (II), absorption by free isocyanate groups was observed at 2,270 cm$^{-1}$ and an absorption band based on —Si—O— groups was also observed at 1,090 cm$^{-1}$. As a result of a quantitative analysis of free isocyanate groups in the modifier, their content was found to be 2.82% while the theoretical value is 3.12%.

Referential Example 3 (Production of Modifier)

While 150 parts of a trimer of hexamethylene diisocyanate ("Colonate EH", trade name; product of Asahi Chemical Industry Co., Ltd.; NCO %=21.3) were stirred thoroughly at room temperature, 99 parts of γ-mercaptopropyltrimethoxysilane were gradually added dropwise and reacted, whereby 249 parts of a modifier (III) were obtained in the form of a colorless clear viscous liquid.

In an infrared absorption spectrum of the modifier (III), absorption by free isocyanate groups was observed at 2,270 cm$^{-1}$ and an absorption band based on —Si—O— groups was also observed at 1,090 cm$^{-1}$. As a result of a quantitative analysis of free isocyanate groups in the modifier, their content was found to be 3.72% while the theoretical value is 4.0%.

Referential Example 4 (Modification of Resin)

To 300 parts of a silicone-acryl polyol copolymer resin (solid content: 40%; hydroxyl number: 32 mg-KOH/g; "Diallomer", trade mark; product of Dainichiseika Color & Chemicals Mfg. Co., Ltd.) which had been obtained by reacting a silicone modifier containing at least one free isocyanate group with an acrylic polyol, 20 parts of the modifier (I) of Referential Example 1 were added and reacted at 80° C. for 8 hours. After the elimination of isocyanate groups was recognized, the solid concentration of the resultant reaction mixture was adjusted to 20%, whereby a modified film-forming resin solution (A) was obtained.

Referential Example 5 (Modification of Resin)

To 300 parts of a silicone-polyvinyl butyral copolymer resin (solid content: 40%; hydroxyl number: 56 mg-KOH/g; "Diallomer", trade mark; product of Dainichiseika Color & Chemicals Mfg. Co., Ltd.) which had been obtained by reacting a silicone modifier containing at least one free isocyanate group with a polyvinyl butyral resin, 24 parts of the modifier (II) of Referential Example 2 were added and reacted at 80° C. for 8 hours. After the elimination of isocyanate groups was recognized, the solid concentration of the resultant reaction mixture was adjusted to 20%, whereby a modified film-forming resin solution (B) was obtained.

Referential Example 6 (Modification of Resin)

To 300 parts of a silicone-polyvinyl formal copolymer resin (solid content: 40%; hydroxyl number: 42 mg-KOH/g; "Diallomer", trade mark; product of Dainichiseika Color & Chemicals Mfg. Co., Ltd.) which had been obtained by reacting a silicone modifier containing at least one free isocyanate group with a polyvinyl formal resin, 21 parts of the modifier (III) of Referential Example 3 were added and reacted at 80° C. for 8 hours. After the elimination of isocyanate groups was recognized, the solid concentration of the resultant reaction mixture was adjusted to 20%, whereby a modified film-forming resin solution (C) was obtained.

Referential Example 7 (Modification of Resin)

To 300 parts of a silicone-polyurethane copolymer resin (solid content: 35%; "Diallomer", trade mark; product of Dainichiseika Color & Chemicals Mfg. Co., Ltd.), 15 parts of an isocyanate-containing silane coupling agent [$(CH_3O)_3Si(CH_2)_3NCO$; "KBM-9007", trade name; product of Shin-Etsu Chemical Co., Ltd.) were added and reacted at 80° C. for 8 hours. After the elimination of isocyanate groups was recognized, the solid concentration of the resultant reaction mixture was adjusted to 20%, whereby a modified film-forming resin solution (D) was obtained.

Referential Example 8 (Modification of Resin)

To 300 parts of a siloxane-modified polyester resin (solid content: 50%; hydroxyl number: 12 mg-KOH/g; "Diallomer", trade mark; product of Dainichiseika Color & Chemicals Mfg. Co., Ltd.) which had been obtained by reacting a siloxane compound containing one or more active hydrogen groups and ε-caprolactone, 12 parts of an isocyanate-containing silane coupling agent [$(C_2H_5O)_3Si(CH_2)_3NCO$; "KBM-9007", trade name; product of Shin-Etsu Chemical Co., Ltd.) were added and reacted at 80° C. for 8 hours. After the elimination of isocyanate groups was recognized, the solid concentration of the resultant reaction mixture was adjusted to 20%, whereby a modified film-forming resin solution (E) was obtained.

Example 1

The modified film-forming resin solution (A) (100 parts) obtained in Referential Example 4, 100 parts of methyl ethyl ketone, 1.0 part of water and 0.01 part of tin octylate were mixed and stirred thoroughly, whereby a release agent of the present invention was obtained.

Example 2

The modified film-forming resin solution (B) (100 parts) obtained in Referential Example 5, 100 parts of methyl ethyl ketone, 1.0 part of water and 0.01 part of tin octylate were mixed and stirred thoroughly, whereby a release agent of the present invention was obtained.

Example 3

The modified film-forming resin solution (C) (100 parts) obtained in Referential Example 6, 100 parts of methyl ethyl ketone, 1.0 part of water and 0.01 part of tin octylate were mixed and stirred thoroughly, whereby a release agent of the present invention was obtained.

Example 4

The modified film-forming resin solution (D) (100 parts) obtained in Referential Example 7, 100 parts of methyl ethyl ketone, 1.0 part of water and 0.01 part of tin octylate were mixed and stirred thoroughly, whereby a release agent of the present invention was obtained.

Example 5

The modified film-forming resin solution (E) (100 parts) obtained in Referential Example 8, 100 parts of methyl ethyl ketone, 1.0 part of water and 0.01 part of tin octylate were mixed and stirred thoroughly, whereby a release agent of the present invention was obtained.

Comparative Example 1

In a mixture consisting of 200 parts of methyl ethyl ketone and 50 parts of toluene, 150 parts of polybutylene adipate (molecular weight: 2,000) and 15 parts of 1,3-butanediol were dissolved. While the solution was stirred thoroughly at 60° C., a solution of 62 parts of hydrogenated MDI in 171 parts of methyl ethyl ketone was gradually added dropwise. After the dropwise addition was completed, they were reacted at 80° C. for 6 hours.

The resin solution thus prepared had a solid content of 35% and a viscosity of 24,000 cps (20° C.).

In addition, a liquid mixture composed of 100 parts of the resin solution prepared as described above, 5 parts of a silicone oil ("SH-200", trade name; product of Toray Dow Corning Co., Ltd.) and 300 parts of methyl ethyl ketone was provided as a comparative coating formulation.

Comparative Example 2

The resin solution (100 parts) prepared in Comparative Example 1, 3 parts of "Teflon" powder ("Lublon L", trade name; product of Daikin Industries, Ltd.) and 345 parts of methyl ethyl ketone/toluene (=1/1) were mixed into a liquid mixture.

To the above liquid mixture, an isocyanate (solid content: 50%; "Takenate D-204", product of Takeda Chemical Industries, Ltd.) was added in an amount to give a liquid mixture/isocyanate weight ratio of 24/3, whereby a comparative coating formulation was obtained.

Comparative Example 3

In 1,000 parts of toluene, 100 parts of a silicone resin ("KS-841", trade name; product of Shin-Etsu Chemical Co., Ltd.) and 1 part of a catalyst ("PL-7", trade name) were dissolved, whereby a coating formulation of the silicone resin was obtained. Evaluation Each of the formulations prepared in Examples 1–5 and Comparative Examples 1–3 was coated on one side of a polyvinyl chloride film having a 100% modulus of 60 kg/cm$^2$ and a thickness of 50 μm so that a dry coat thickness of 0.6 μm was given. The solvent was caused to evaporate in a drier, whereby a sample having a release coating layer was prepared.

When the temperature was set at a high temperature of 100° C. or higher, the polyvinyl chloride film became softened and was unable to maintain its shape as a film.

After being left as it was at room temperature (23° C., 46% humidity) for 15 days, each sample obtained above was subjected to various tests.

An acrylic adhesive tape of 20 mm wide (product of Sekisui Chemical Co., Ltd.) was pressed and adhered by a rubber roller having a dead weight of 2 kg onto each of the various coated base materials prepared as described above. After leaving them for 1 day under room temperature conditions (23° C., humidity: 46%) and then for 3 days at a high temperature condition (40° C., humidity: 90% min.), the release property, the residual adhesive force, the percent retention of residual adhesive force, the separation tendency of the release coating layer and the writing quality with a quick-drying felt pen were measured. The measurement results on the coating formulations of the examples and comparative examples are summarized in Table 1 and Table 2, respectively.

Release property:
An adhesive tape of 20 mm wide was adhered to each release coating layer. After they were stored at 40° C. for 24 hours under a load of 20 g/cm$^2$, the adhesive tape was pulled off at an angle of 180° and a velocity of 300 mm/min, whereby the force required to peel off the adhesive tape was measured in terms of grams at 20° C.

Residual adhesive force:
The adhesive tape after the above-described measurement of the release property was adhered to a stainless steel plate #280. A tape roller of 2 kg was reciprocated once on the adhesive tape. Thirty minutes later, the adhesive tape was pulled off at an angle of 180° and a velocity of 300 mm/min, whereby the force required to peel off the adhesive tape was measured in terms of grams at 20° C.

Percent retention of residual adhesive force:
The residual adhesive force is indicated in terms of percentage with 100% for the adhesive force (320 g/20 mm) to a stainless steel plate #280 upon adhesion of a clean adhesive tape, which had not be subjected to peeling resistance, to the stainless steel plate.

Separation tendency:
A separation tendency test of each release coating layer was conducted on a sample which had been prepared by once reciprocating gauze under a load of 50 g/cm$^2$ on the release coating layer.

Writing quality with quick-drying felt pen:
Letters were written with a commercial oil-base quick-drying felt pen on each release coating layer. Investigation was made as to whether the ink was repelled or not upon writing.

TABLE 1

| | Example | | | | |
|---|---|---|---|---|---|
| | 1 | 2 | 3 | 4 | 5 |
| Peeling force (g/20 mm) | | | | | |
| After 1 day at room temperature (23° C., 46%) | 20 | 17 | 22 | 32 | 12 |
| After 3 days at high temp. (40° C., 90% min.) | 22 | 20 | 25 | 28 | 18 |
| Residual adhesive force (g/20 mm) | | | | | |
| After 1 day at room temperature (23° C., 46%) | 301 | 310 | 305 | 284 | 310 |
| After 3 days at high temp. (40° C., 90% min.) | 297 | 301 | 295 | 275 | 290 |
| Percent retention of residual adhesive force (%) | | | | | |
| After 1 day at room temperature (23° C., 46%) | 94 | 96 | 95 | 88 | 92 |
| After 3 days at high temp. (40° C., 90% min.) | 92 | 94 | 92 | 86 | 90 |
| Separation tendency After 1 day at room temperature (23° C., 46%) | Good | Good | Good | Good | Good |
| Writing quality by quick-drying felt pen After 1 day at room temperature (23° C., 46%) | Good | Good | Good | Good | Good |

TABLE 2

| | Comparative Example | | |
|---|---|---|---|
| | 1 | 2 | 3 |
| Peeling force (g/20 mm) | | | |
| After 1 day at room temperature (23° C., 46%) | 45 | 86 | 15 |
| After 3 days at high temp. (40° C., 90% min.) | 22 | *1 | 12 |
| Residual adhesive force (g/20 mm) | | | |
| After 1 day at room temperature (23° C., 46%) | 221 | 310 | 209 |
| After 3 days at high temp. (40° C., 90% min.) | 188 | *1 | 155 |
| Percent retention of residual adhesive force (%) | | | |
| After 1 day at room temperature (23° C., 46%) | 69 | 96 | 64 |
| After 3 days at high temp. (40° C., 90% min.) | 58 | *1 | 47 |
| Separation tendency After 1 day at room temperature (23° C., 46%) | Poor | Poor | Poor |
| Writing quality by quick-drying felt pen After 1 day at room temperature (23° C., 46%) | Poor | Good | Poor |

*1: The release layer was torn.

We claim:

1. In a release agent comprising a resin selected from the group consisting of polyvinyl butyral resins, polyvinyl formal resins, acrylic resins, polyurethane resins, polyester resins, vinyl chloride/vinyl acetate/vinyl alcohol copolymer resins, alkyl resins, epoxy resins, polybutadiene resins, polyurea resins, modified cellulose resins, silicone resins, melamine resins, fluororesins, polyamide resins, phenoxy resins, and siloxane-modified polyester resins obtained by the reaction of siloxane compounds containing one or more active hydrogen groups with ε-caprolactone, wherein said resin comprises at least one siloxane moiety and at least one hydrolyzable silyl group, wherein the improvement comprises reacting at least said one hydrolyzable silyl group with a silane coupling agent containing at least one free isocyanate group.

2. The release agent of claim 1, wherein the silane coupling agent is of the formula (I):

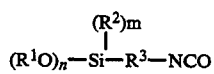 (I)

wherein $R^1$ is a lower alkyl group, $R^2$ is a lower alkyl or lower alkoxy group, $R^3$ is a $C_{1-6}$ alkyl group, m is an integer of 1–3 and n equals 3 minus m.

3. The release agent of claim 1, wherein the silane coupling agent is the reaction product of an organic polyisocyanate and compound of the formula (II):

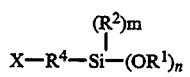 (II)

wherein $R^1$ is a lower alkyl group, $R^2$ is a lower alkyl or lower alkoxy group, $R^4$ is a divalent organic group, optionally substituted with an oxygen, nitrogen, or sulfur atom, selected from the group consisting of a $C_{2-20}$-aliphatic group, an aromatic group, and an aliphatic aromatic group, and X is selected from the group consisting of an amino group, an epoxy group, a hydroxyl group, and a thiol group.

4. The release agent according to claim 3, wherein said compound of the formula (II) is selected from the group consisting of:

$H_2N(CH_2)_2NH(CH_2)_3Si(OCH_3)_2(CH_3)$, $H_2N(CH_2)_2NH(CH_2)_3Si(OC_2H_5)_2(CH_3)$, $H_2N(CH_2)_2NH(CH_2)_3Si(OCH_3)_3$, $H_2N(CH_2)_2NH(CH_2)_3Si(OC_2H_5)_3$, $H_2N(CH_2)_3Si(OCH_3)_3$, $H_2N(CH_2)_3Si(OC_2H_5)_3$,

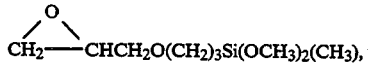

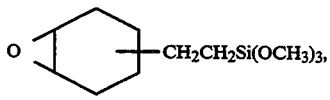

$HS(CH_2)_3Si(OCH_3)_3$, $HS(CH_2)_3Si(OC_2H_5)_3$, and $H_2N(CH_2)_2-NHCH_2-Ph-CH_2CH_2Si(CH_3)_3$, wherein Ph is

5. The release agent according to claim 3, wherein the organic polyisocyanate is selected from the group consisting of:

Toluene-2,4-diisocyante,
4-Methoxy-1,3-phenylene diisocyanate,
4-Isopropyl-1,3-phenylene diisocyanate,
4-Chloro-1,3-phenylene diisocyanate,
4-Butoxy-1,3-phenylene diisocyanate,
2,4-Diisocyanate-diphenylether,
Methylene diisocyanate,
4,4-Methylenebis(phenyl isocyanate),
Durylene diisocyanate,
1,5-Naphthalane diisocyanate,
Benzidine diisocyanate,
o-Nitrobenzidine diisocyanate,
4,4-Diisocyanate dibenzidyl,
1,4-Tetramethylene diisocyanate,
1,6-Tetramethylene diisocyanate,
1,10-Decamethylene diisocyanate,
1,4-Cyclohexylene diisocyanate,
Xylylene diisocyanate,
4,4-Methylenebis(cyclohexyl isocyanate),
1,5-Tetrahydronaphthalene diisocyanate,

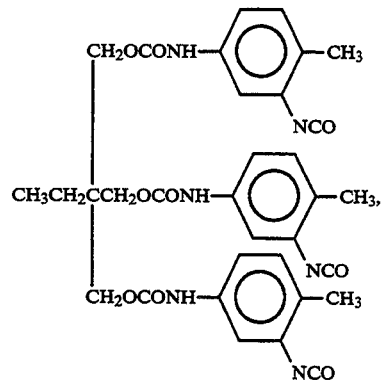

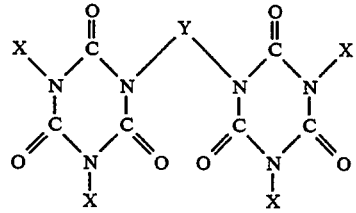

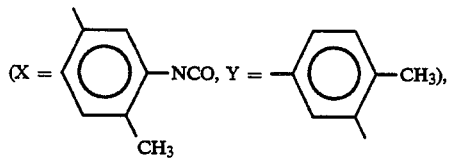

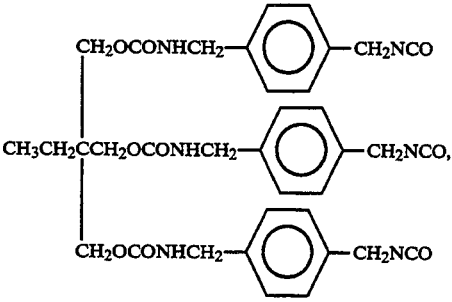

-continued

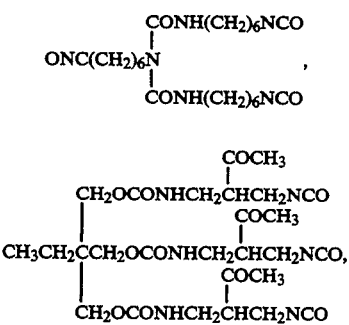

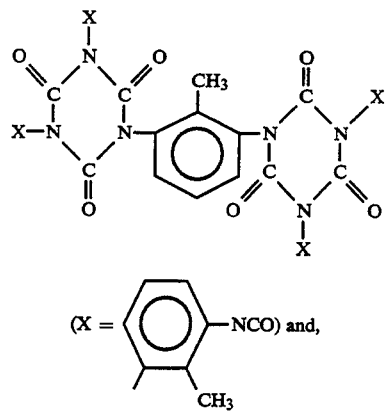

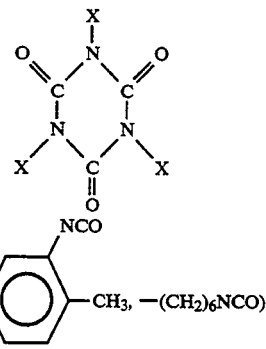

6. The release agent according to claim 1, which further contains 0.1–60 wt % of silanol groups based on the weight of said resin.

7. The release agent according to claim 6, wherein the content of silanol groups is preferably 3–40 wt. % based on the weight of said resin.

8. The release agent according to claim 1, wherein the release agent is curable using a catalyst selected from the group consisting of alkyl titanate salts, tin octylate, dibutyltin dilaurate, and dibutylamine-2-ethyl-hexoate.

9. The release agent according to claim 8, wherein the catalyst is present in a proportion of about 0.0001–5 wt. %.

* * * * *

UNITED STATES PATENT AND TRADEMARK OFFICE
CERTIFICATE OF CORRECTION

PATENT NO. : 5,384,365
DATED : January 24, 1995
INVENTOR(S) : Kazuyuki HANADA, et al.

It is certified that error appears in the above-indentified patent and that said Letters Patent is hereby corrected as shown below:

On the title page, Item [75], the inventorship should read:

--Kazuyuki Hanada; Iwao Misaizu; Masahi Saito; Katsutoshi Torii; Katsumi Kuriyama, all of Tokyo, Japan--

Signed and Sealed this

Thirtieth Day of May, 1995

*Attest:*

BRUCE LEHMAN

*Attesting Officer*      *Commissioner of Patents and Trademarks*